United States Patent [19]

Blasiole et al.

[11] Patent Number: 5,823,768
[45] Date of Patent: Oct. 20, 1998

[54] ROTARY COMBUSTOR AND SEAL ASSEMBLY THEREFOR

[75] Inventors: George A. Blasiole; Jeffrey Mitchell; Alvin Steffey, all of Greensburg; Donald P. Flading, Manor Boro, all of Pa.

[73] Assignee: Westinghouse Electric Corporation, Pittsburgh, Pa.

[21] Appl. No.: 585,288

[22] Filed: Jan. 11, 1996

[51] Int. Cl.⁶ .................................................. F27B 7/24
[52] U.S. Cl. ............................................................ 432/115
[58] Field of Search ................................. 432/115, 117, 432/103; 277/138, 139, 173, 148; 34/108

[56] References Cited

U.S. PATENT DOCUMENTS

| | | | |
|---|---|---|---|
| 3,700,220 | 10/1972 | Talago ........................................ | 432/32 |
| 4,342,555 | 8/1982 | Bohanszky ............................... | 432/115 |
| 4,875,691 | 10/1989 | Kosi ........................................ | 277/147 |
| 4,950,155 | 8/1990 | Brienza et al. ......................... | 432/115 |
| 4,961,588 | 10/1990 | Brienza ................................... | 277/148 |
| 4,993,940 | 2/1991 | McIlvaine ............................... | 432/105 |
| 5,103,745 | 4/1992 | Harloff ................................... | 110/246 |
| 5,112,222 | 5/1992 | Flading et al. ........................... | 432/115 |
| 5,174,750 | 12/1992 | Flading et al. ........................... | 432/115 |
| 5,263,724 | 11/1993 | Hansen et al. ........................... | 277/30 |

FOREIGN PATENT DOCUMENTS 1071909  2/1984  U.S. ...................................... 432/115

Primary Examiner—William Doerrler
Attorney, Agent, or Firm—D. P. Cillo

[57] ABSTRACT

Rotary combustor and seal assembly therefor. A rotary combustor includes a shroud ring encircling an inlet opening of a rotatable kiln in which municipal waste is burned, the waste heat being used to generate electricity. The kiln includes a plurality of parallel heat transfer tubes arranged in spaced parallel circular array. The end portions of the tubes terminate in a ring header or plenum that surrounds the shroud ring, so as to define an annular gap between the ring header and shroud ring. A plurality of blocking members are connected to the kiln and interposed between the plenum and the shroud. The shroud and the blocking members cooperate to seal the gap. Moreover, a portion of each blocking member extends over a predetermined portion of a respective one of the tubes and over a predetermined portion of the plenum to protect the plenum and the pipes from impact damage by the municipal waste.

2 Claims, 5 Drawing Sheets

ROTARY COMBUSTOR AND SEAL ASSEMBLY THEREFOR

BACKGROUND OF THE INVENTION

This invention generally relates to rotary combustors and more particularly relates to a rotary combustor and seal assembly therefor.

A rotary combustor is a device for burning municipal waste and for generating electricity using waste heat produced as a by-product of the combustion. More specifically, the municipal waste is deposited into a feed hopper and from there into a rotating cylindrical kiln that is formed by a plurality of parallel heat transfer tubes arranged in a circular array A stationary shroud ring typically encircles the inlet opening of the kiln for enclosing and containing the heat and hot gases within the combustor. The tubes allow a liquid heat transfer medium (i.e., water) to flow therethrough, with a steam-water mixture being produced within the tubes due to the heat transfer from the burning waste to the fluid in the heat transfer tubes. The fluid in the pipes is transported to a heat exchanger disposed in a boiler for reasons disclosed hereinbelow.

Air is charged to the kiln through a porous web-like structure interconnecting the heat transfer pipes to assist in the combustion process occurring in the kiln. Combustion gases from the kiln pass to a boiler and over the previously mentioned heat exchanger disposed in the boiler to produce superheated steam. The superheated steam is fed to a turbine-generator for producing electricity which may be provided to a transmission grid of an electric utility to produce revenue. The combustion process occurring in the kiln reduces the volume of the municipal waste by more than ninety percent, with the resultant ash being hauled to a landfill.

However, applicants have observed that some of the municipal waste being fed from the feed hopper and into the kiln may enter the space between the rotating kiln and the stationary shroud ring and become stuck thereat. The presence of the municipal waste between the shroud ring and the rotating kiln may interfere with the proper rotation of the kiln thereby causing the kiln to "jam" or resist free rotation thereof. Such a problem is exacerbated by the shroud ring occasionally being out-of-round, nonconcentric with respect to the centerline of the cylindrical kiln, or nonperpendicular with respect to the centerline of the kiln. In addition, the presence of the municipal waste between the shroud ring and the kiln may tend to erode and otherwise damage a ring header connected to the end portions of the previously mentioned heat transfer tubes. The ring header is disposed near the shroud ring. It would therefore be desirable to protect the ring header and end portions of the tubes by means of a suitable sealing device that seals the space between the ring header and shroud ring.

Sealing devices for rotary combustors are known. Such a sealing device is disclosed in U.S. Pat. No. 5,112,222 titled "Debris Tolerant Seal" issued May 12, 1992 in the name of Donald P. Flading, et al. and assigned to the assignee of the present invention. This patent discloses a seal for a rotary combustor, the seal being disposed on the inlet end ring header so as to extend radially inwardly therefrom. The seal cooperates with a parallel spaced-apart and diverging surface on an adjacent refractory ring to form a seal which will not become jammed with waste materials and also allows for radial and axial thermal expansion of the rotary combustor. Although the Flading patent discloses a seal for a rotary combustor, this patent does not disclose a seal that, for example, protects the ring header and end portions of the heat transfer tubes.

Therefore, what is needed is a rotary combustor having a suitable seal assembly therefor that seals the space between the shroud and rotating kiln as it simultaneously protects the ring header and end portions of the combustor's heat transfer tubes.

SUMMARY OF THE INVENTION

Disclosed herein are a rotary combustor and seal assembly therefor. The rotary combustor includes a shroud ring encircling an inlet opening of a rotatable kiln in which municipal waste is burned, the waste heat being used to generate electricity. The kiln includes a plurality of parallel heat transfer tubes arranged in spaced parallel circular array. The end portions of the tubes terminate in a ring header or plenum that surrounds the shroud ring, so as to define an annular gap between the ring header and shroud ring. A plurality of blocking members are connected to the kiln and interposed between the plenum and the shroud. The blocking members cooperate to seal the gap. Moreover, a portion of each blocking member extends over a predetermined portion of a respective one of the tubes and over a predetermined portion of the plenum to protect the plenum and the tubes from impact damage by the municipal waste.

In its broad form the invention is, in a rotary combustor having a first structure and a second structure defining a gap therebetween, a seal assembly for sealing the gap and protecting the second structure, comprising a block member disposed in the gap for sealing the gap and covering the second structure for protecting the second structure.

In its broad form the invention is also a rotary combustor for burning waste material, comprising a rotatable kiln adapted to burn waste material therein, said kiln having an inlet opening; a feed hopper disposed adjacent the inlet opening of said kiln for receiving the waste material and for thereafter feeding the waste material through the inlet opening and into said kiln; a circular shroud encircling the inlet opening for enclosing and containing the heat and hot gases within the combustor; a tubular plenum surrounding said shroud, said shroud and said plenum defining an annular gap therebetween; and a plurality of adjacent blocking members interposed between said shroud and said plenum for sealing the gap and extending over the plenum for protecting the plenum.

An object of the present invention is to provide a rotary combustor and seal assembly therefor that seals the space between the shroud ring and rotating kiln of the rotary combustor as it simultaneously protects the shroud ring and end portions of the combustor's heat transfer tubes.

A feature of the present invention is the provision of a plurality of blocking members interposed between the shroud and the plenum, which blocking members cooperate to seal the gap, the blocking members being connected to the kiln.

An advantage of the present invention is that use of the invention avoids the need for a qualified welder because no weldment is made to the inlet plenum, which is a pressure boundary. This results in reduced labor costs to fabricate the rotary combustor.

Another advantage of the present invention is that the seal assembly substantially seals the space between the shroud and the rotating kiln as it simultaneously protects the inlet plenum and end portions of the heat transfer tubes from impact damage by the waste material, which waste material may contain relatively heavy bolts, pipes, tools and other debris.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the present invention, it is believed the invention will be better understood from the following description when taken in conjunction with the accompanying drawings wherein:

DESCRIPTION OF THE PREFERRED EMBODIMENTS

Figure 1:
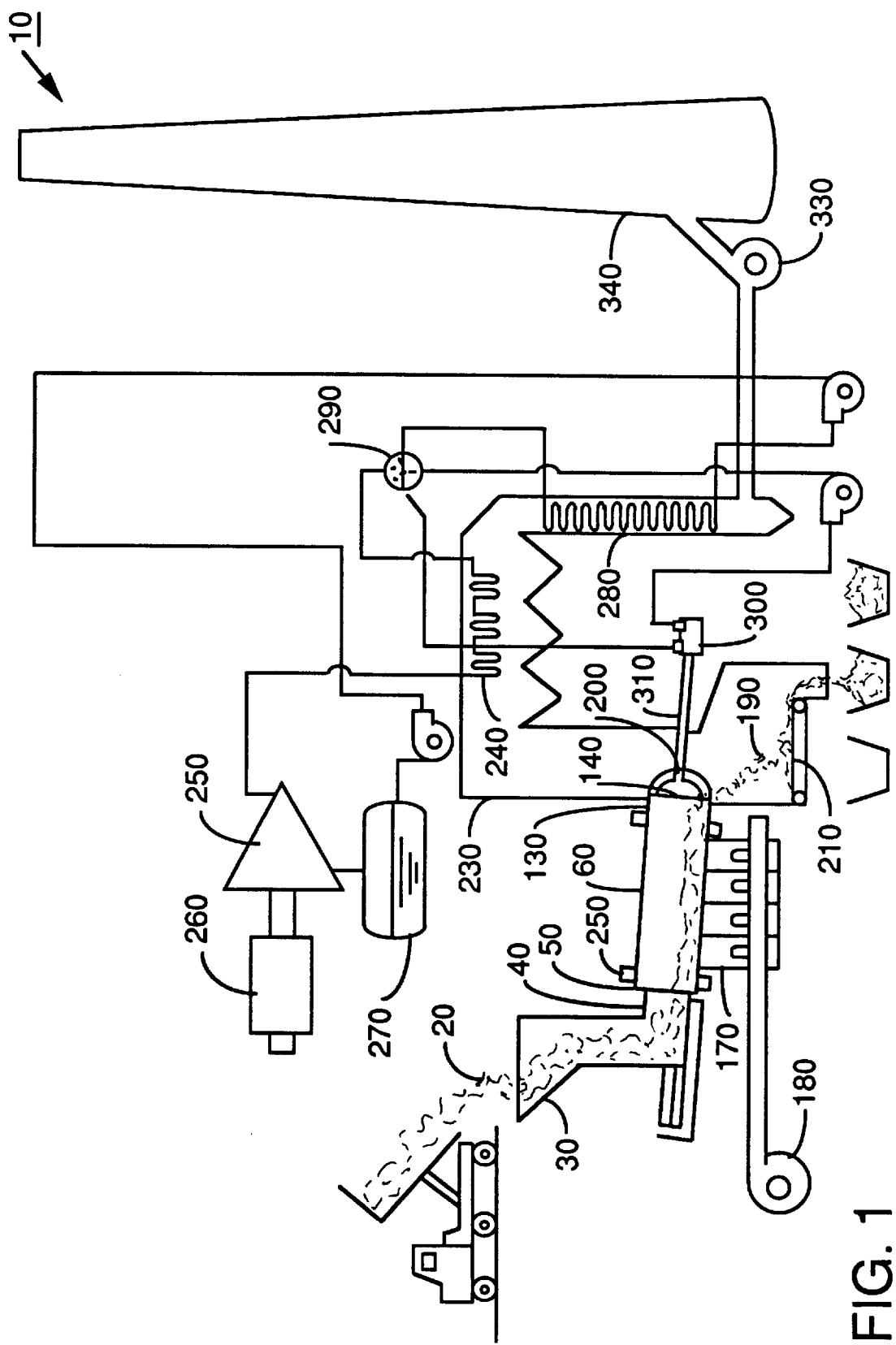
FIG. 1 illustrates a typical rotary combustor with parts removed for clarity, the combustor including a feed chute having an outlet end disposed adjacent and inlet end of a rotatable kiln.
Figure 2:
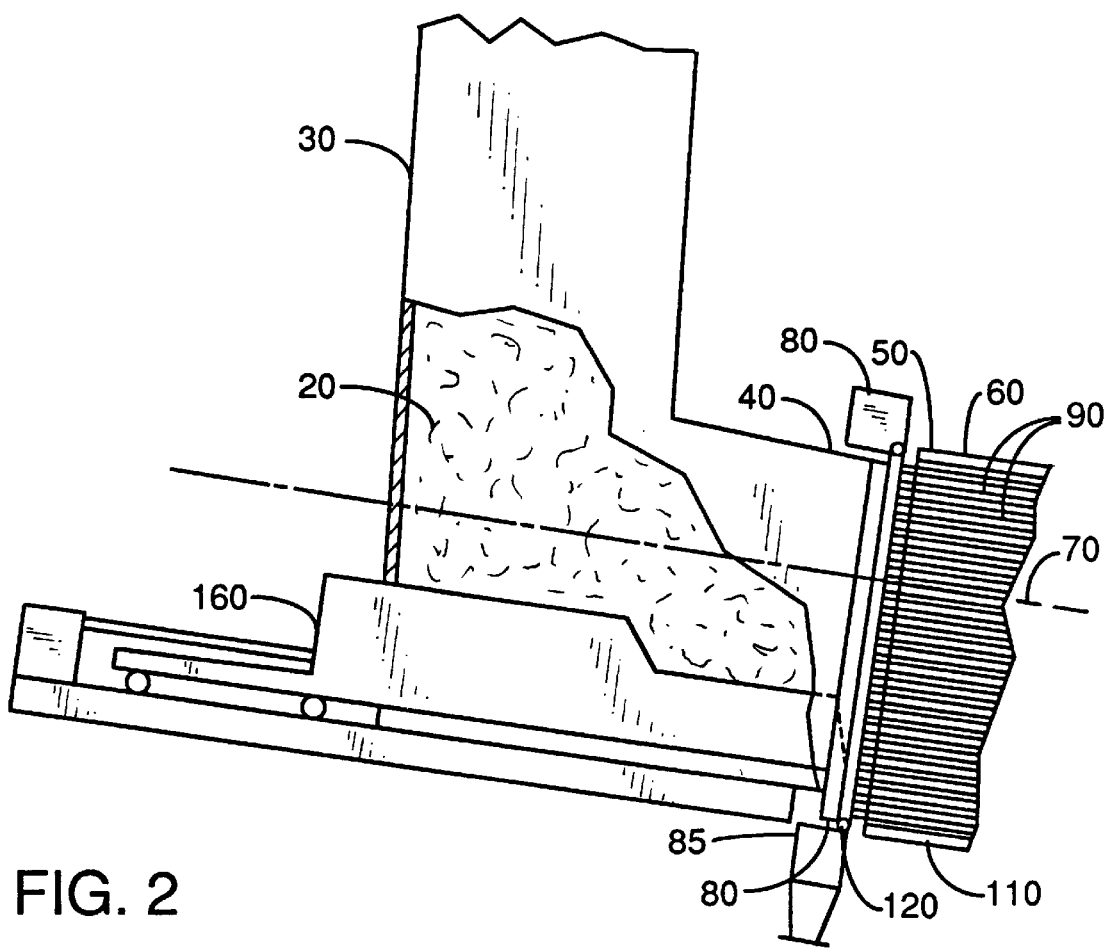
FIG. 2 is a view in partial elevation showing a shroud ring interposed between the outlet end of the feed hopper and the inlet end of the kiln.
Figure 3:
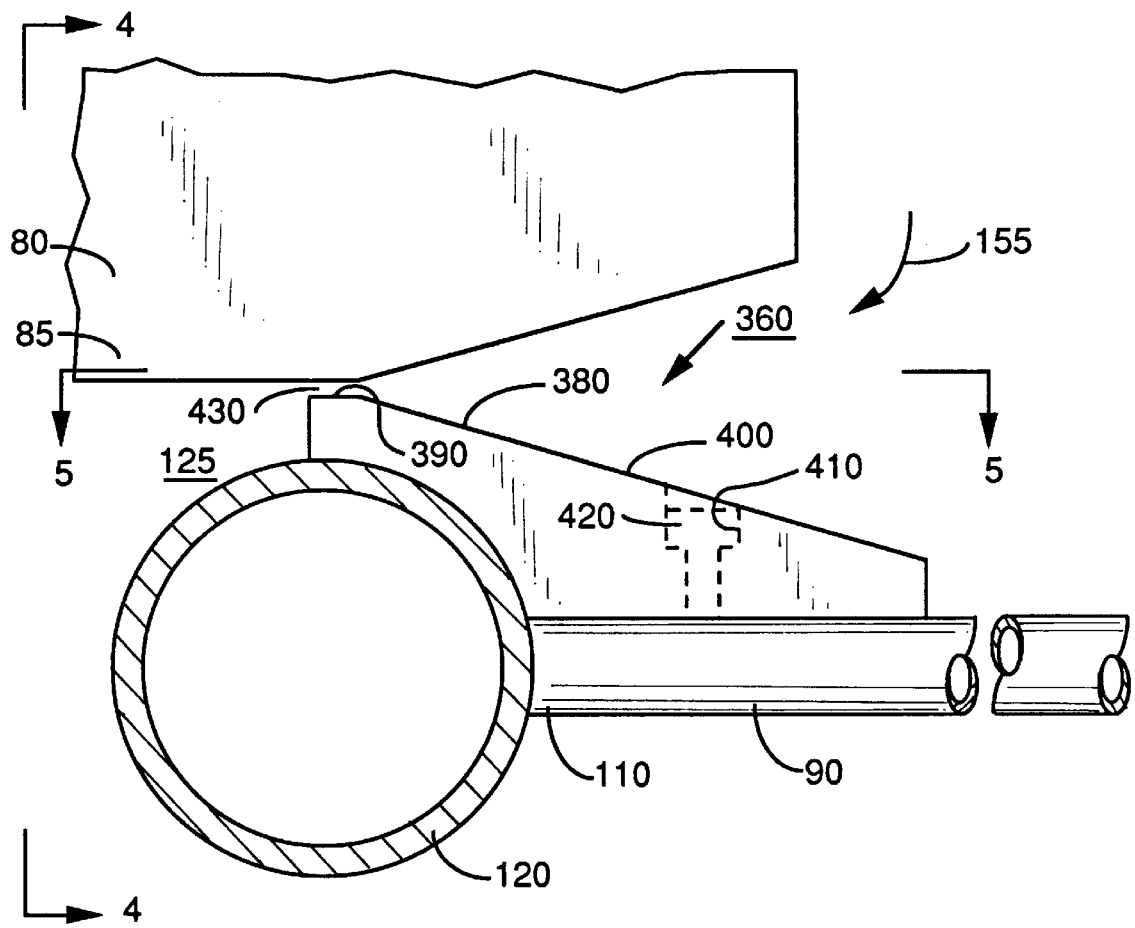
FIG. 3 is a view in partial elevation showing a lower portion of the shroud ring disposed adjacent a header and an end portion heat transfer tube connected to the header, the header and the shroud defining a gap therebetween, this view also showing the seal assembly of the invention sealing the gap and protecting the end portion of the heat transfer tube.
Figure 4:
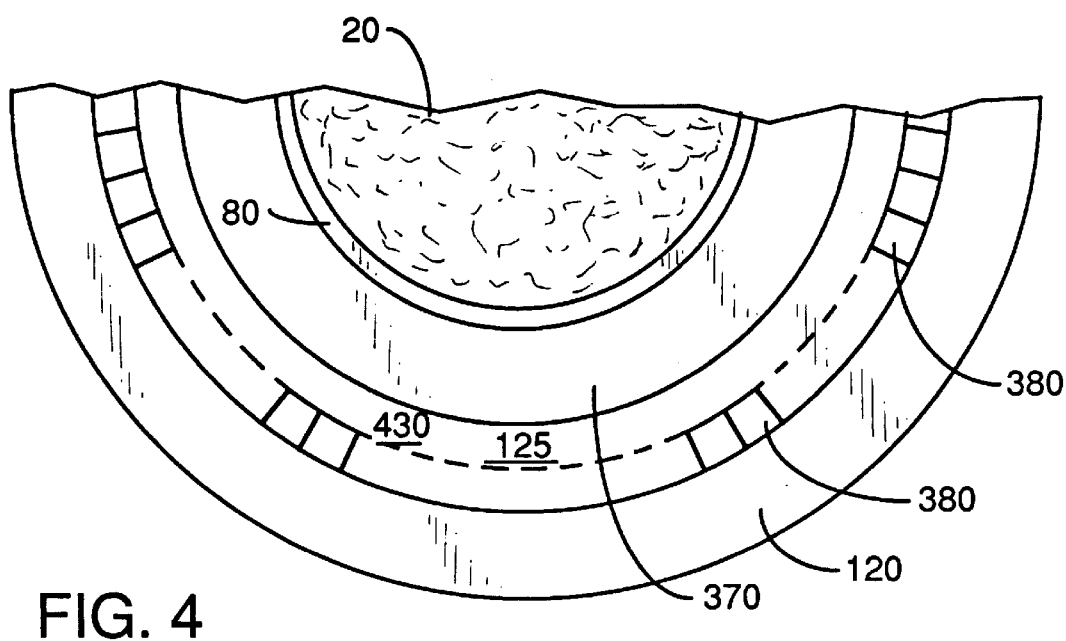
FIG. 4 is a view taken along section line 4—4 of FIG. 3.
Figure 5:
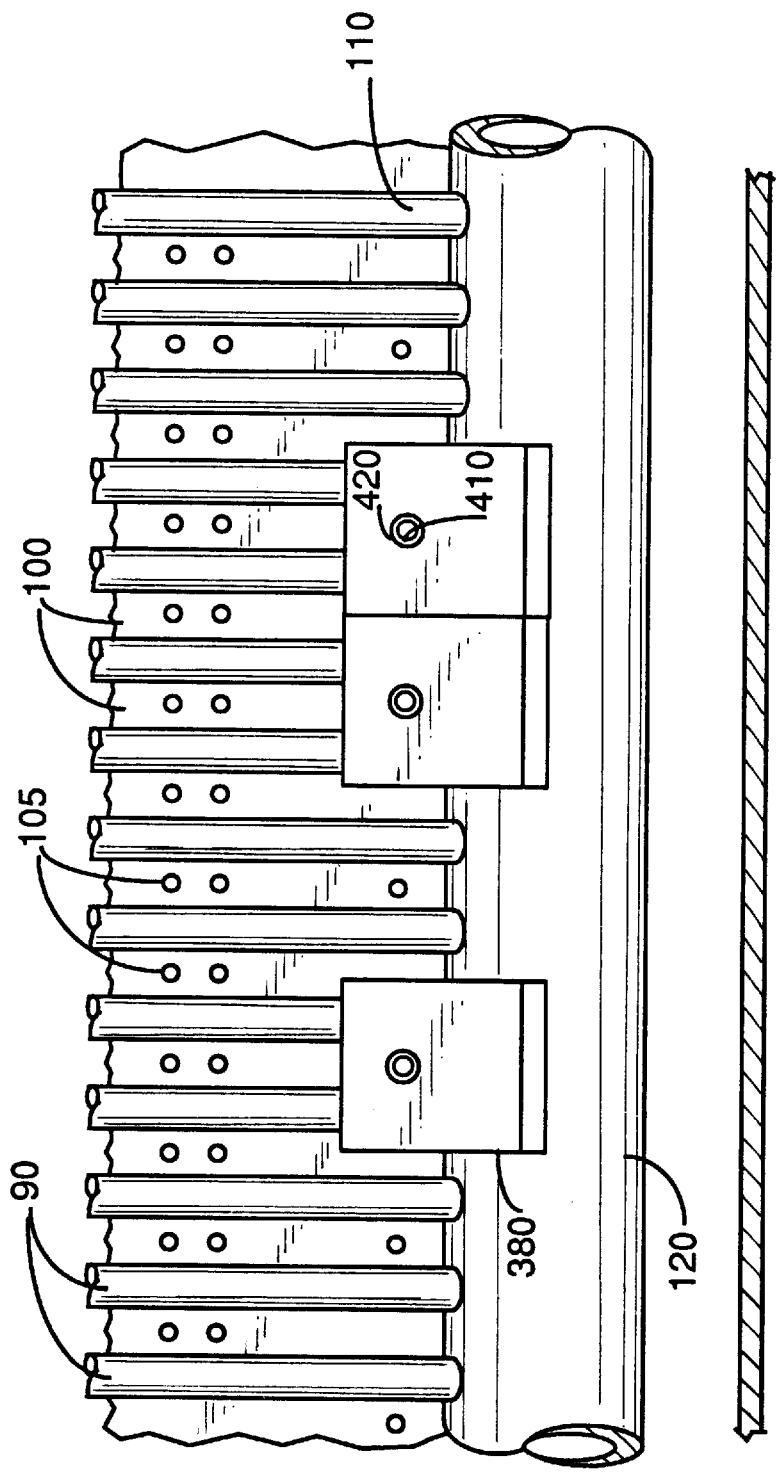
FIG. 5 is a view taken along section line 5—5 of FIG. 4.

Referring to FIGS. 1, 2 and 3, there is shown a rotary combustor, generally referred to as 10, for burning municipal waste 20 and for converting the waste heat into electricity. Combustor 10 comprises a feed hopper or feed chute 30 adapted to receive waste 20 therein. Waste 20 may include objects such as heavy bolts, pipes, tools and other debris. Feed chute 30 has an outlet end 40 aligned with an inlet end 50 of a generally cylindrical and rotatable kiln 60, which is rotatable about an inclined longitudinal axis 70. Interposed between outlet end 40 and inlet end 50 and connected to feed chute 30 is a stationary and annular shroud ring 80 encircling inlet end 50 for enclosing and containing the heat and hot gases within combustor 60. Annular shroud ring 80 includes a marginal circumferential edge 85. Kiln 60, which rotates while shroud ring 80 remains stationary, includes a plurality of heat transfer tubes arranged in spaced parallel circular array centered about axis 70. The purpose of tubes 90 is to conduct a heat transfer medium (i.e., water or a steam-water mixture) therethrough for removing heat generated by kiln 60. Moreover, interconnecting tubes 90 and integrally formed therewith is a web-shaped support structure 100 (see FIG. 5) for supporting tubes 90, web structure 110 having a multiplicity of holes 105 for allowing air to enter kiln 60 to aid combustion therein. Referring to FIGS. 1, 2 and 3, each of the tubes 90 has a first end portion 110 terminating at a tubular ring-shaped inlet header or inlet plenum 120 that encircles shroud ring 80. In this regard, inlet plenum 120 encircles shroud ring 80 so as to define an annular gap 125 therebetween. Each first end portion 110 may be attached to inlet plenum 120, such as by welding. Each of the tubes 90 also has a second end portion 130 terminating at a tubular ring-shaped outlet header or outlet plenum 140 that is connected to a rotary joint 300 for reasons disclosed hereinbelow. However, some of waste 20 may avoid kiln 60 and tend to travel toward gap 125, such as in the general direction illustrated by the arrow 155 shown in FIG. 3. This is undesirable for the reasons disclosed hereinbelow.

Still referring to FIGS. 1, 2 and 3, waste 20 is urged by a ram feeder 160 from feed chute 30 and into kiln 60 where waste 20 is burned. In this regard, combustion is aided by air forced through a windbox 170, which forced air may be by means of a fan 180 that forces air through holes 105 and into kiln 60. Ash 190 from the combustion, which tumbles toward discharge end 200, will fall out discharge end 200 of inclined kiln 60 and from there onto a moving grate 210 which conveys ash 190 to a conveyance system 220 for removal to a disposal site.

Referring again to FIGS. 1, 2 and 3, the discharge end of kiln 60 communicates with a boiler 230 having a bank of superheaters 240 therein to produce superheated steam, as disclosed in more detail presently. In this regard, hot gases from the combustion rise upwardly from the discharge end 200 of kiln 60 and travel across the bank of superheaters 240, so that the steam-water mixture flowing into superheaters 240 is vaporized into superheated steam. Superheaters 240 supply the superheated steam to a turbine 250 which turns an electrical generator 260 for producing electricity. After the steam is used by turbine 250, it flows to a condenser 270 where it is condensed into liquid water. Also disposed in boiler 230 is an "economizer" heat exchange device 280, for reasons disclosed presently. The water from condenser 270 is pumped to economizer 280 for removing additional heat from the hot gases as the hot gases pass over economizer 280, which occurs after the hot gases have passed superheaters 240. The fluid exiting economizer 280 flows to a steam drum 290 where the fluid exists in a liquid and vapor state. The liquid portion of the fluid in steam drum 290 is pumped to a rotary joint 300. Rotary joint 300 is in fluid communication with a coaxial pipe 310 that feeds the liquid water into tubes 90 which returns a hot water and steam mixture to rotary joint 300. The steam-water mixture flows (such as via a pipe 320) from rotary joint 300 to steam drum 290. The steam from steam drum 290 flows into the bank of superheaters 240 to be superheated prior to being supplied to turbine 250.

As best seen in FIG. 1, after the hot combustion gases flowing through boiler 230 pass economizer 280, the gases are then drawn, such as by fan 330, into a flue stack 340 for release into the atmosphere. It should be understood, however, that rotary combustor 10 may further include a dry scrubber (not shown) and a baghouse (not shown) in communication with both boiler 230 and flue stack 340 for removing undesirable constituents from the gases before the gases flow into flue stack 340. Moreover, rotary combustor 10 further includes two annular tires 250 respectively surrounding the inlet end and the discharge end of kiln 60 for rotating kiln 60 about the axis 70. One of tires 250 includes sprocket teeth (not shown) for engaging a chain belt (not shown) that is pulled by a motor (not shown), the chain belt rotating the sprocket teeth of tire 250 which tire 250 in turn rotates kiln 60 about inclined axis 70.

Referring to FIG. 3, it is important to seal gap 125 for reasons disclosed presently. Sealing gap 125 is important because a portion of the waste material 20 being fed from feed chute 30, through shroud ring 80 and into kiln 60 may find its way into gap 125, such as along the direction of arrow 155. Once in gap 125, such waste 20 may tend to deposit, build-up or "jam" in gap 125 and impede the ability of kiln 60 to rotate relative to stationary shroud ring 80. More specifically, "jamming" of gap 125 with waste material 20 will impede the ability of inlet plenum 120, which is a feature of kiln 60, to rotate relative to stationary shroud ring 80. This problem may arise because shroud ring 80 may not be perfectly round and may not be exactly concentric with respect to axis 70. Moreover, inlet plenum 120 may not be perfectly round, exactly concentric with axis 70, or perfectly perpendicular with respect to axis 70. Thus, inlet plenum 120 may have distortions therein resulting in a variable inside diameter in both the radial and axial directions. Applicants have observed that such distortions may occur after many years of normal operation of rotary combustor 10. In spite of difficulties presented by such distortions that may be present in inlet plenum 120, it nonetheless remains desirable to provide a suitable seal assembly to seal gap 125 in order to prevent jamming thereof.

Therefore, turning now to FIGS. 2, 3, 4 and 5, rotary combustor 10 further comprises a seal assembly, generally referred to as 360, for sealing gap 125 and for protecting inlet plenum 120 from impact damage by the waste 20. Seal assembly 360 comprises a plurality of adjacent side-by-side blocking members 380 (only some of which are shown for clarity) are interposed between shroud 80 and inlet plenum 120 to assist in sealing gap 125. Each of the blocking members 380 extends over approximately one-half the radial exterior portion of inlet plenum 120 and also extends over tube end portion 110 for protecting inlet plenum 120 and end portion 110 from impact damage by waste material 20. Each blocking member 380 is generally ramped-shaped in transverse cross section and includes a first surface 390 oriented generally parallel with respect to axis 70. Each blocking member 380 also includes a second surface 400 contiguous with first surface 380 but canted radially outwardly at an angle of approximately 30 degrees with respect to axis 70. Formed through the ramped portion of each blocking member 380 is a bore 410 for receiving a bolt 420 that extends through bore 410 and connects each blocking member 380 to web structure 100. In this manner, welding of blocking member 380 to inlet plenum 120 is avoided. It is important to avoid welding blocking member 380 to inlet plenum 120. This is important because welding a structure to inlet plenum 120 requires use of a code qualified welder. More specifically, inlet plenum 120 is a pressure vessel or pipe and the American Society of Mechanical Engineers code require that only code qualified welders make such weldments. That is, use of the invention avoids use of a code qualified welder because no weldment is made to inlet plenum 120. This results in reduced labor costs to fabricate rotary combustor 10.

As best seen in FIG. 3, circumferential edge 85 and blocking members 380 define an annular clearance space 430 therebetween. Space 430 allows for interference-free relative motion between circumferential edge 85 and first surface 390 of blocking members 380. That is, inlet plenum 120 may tend to warp during operation of rotary combustor 10 due to radial thermal expansion and contraction. Therefore, space 430 is sized to allow inlet plenum 120 to radially thermally expand in such a manner that first surface 390 will not rub-against (i.e., interfere) with edge 85.

Figure 6:
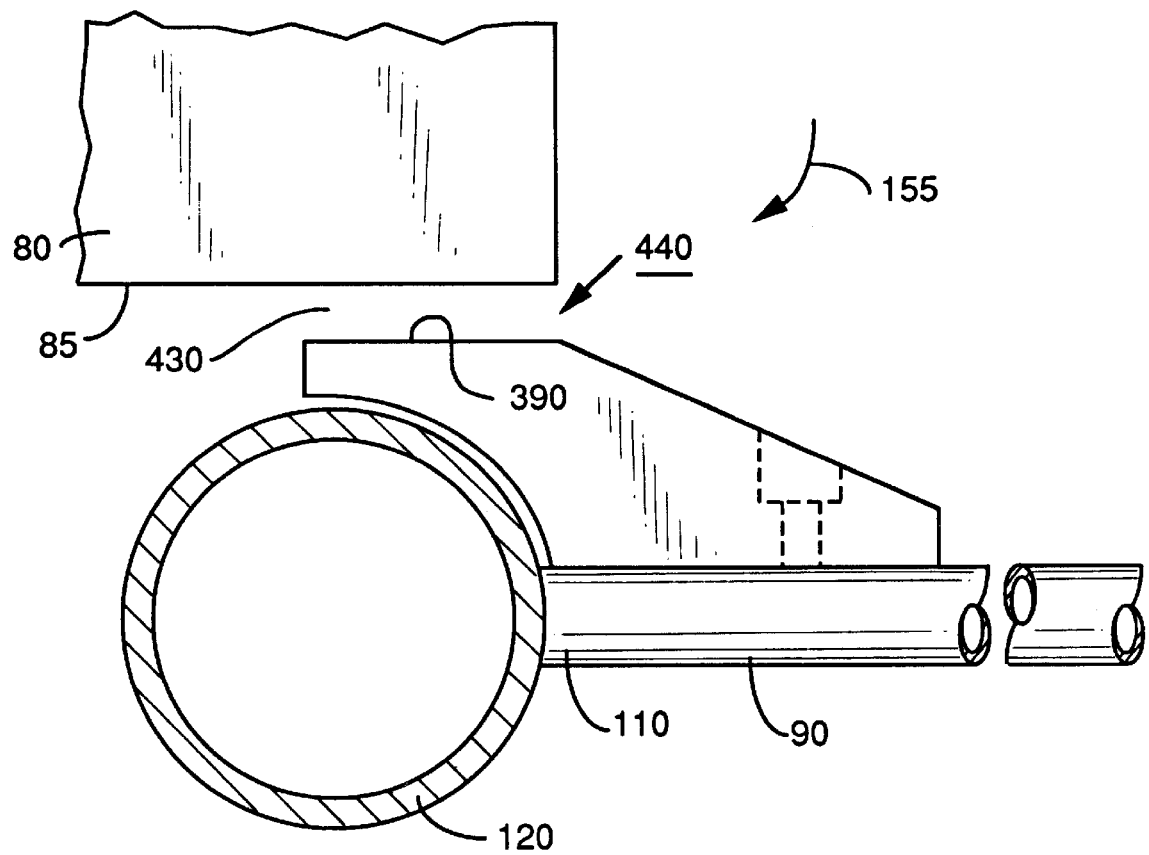
FIG. 6 is a view in partial elevation of an alternative embodiment of the invention.

Referring to FIG. 6, there is shown an alternative embodiment of applicants' seal assembly, generally referred to as 440.

Therefore, what is provided is a rotary combustor and seal assembly therefore.

What is claimed is:

1. In a rotary combustor having a rotatable kiln having an inlet opening for receiving waste material therethrough and a shroud encircling the inlet opening, the kiln made-up of a plurality of parallel spaced-apart heat transfer tubes interconnected by a web-shaped support structure, each of the tubes having end portions thereof terminating at a ring-shaped plenum disposed adjacent to and surrounding the shroud, the shroud and the plenum defining an annular gap therebetween capable of allowing waste material therethrough, a seal assembly for simultaneously sealing the gap and protecting the plenum and the end portions of the heat transfer tubes, the seal assembly comprising a plurality of adjacent block members interposed between the shroud and the plenum for sealing the gap and extending over the plenum for protecting the plenum from damage by the waste material, each of said block members attached to the web-shaped support structure for supporting the block members thereon, wherein each of said block members has an arcuate-shaped cut-out conforming to the curvature of the tubular plenum to cover a predeterrmined portion of the plenum, said flange and said block members defining an annular clearance space therebetween for allowing interference-free motion of said block members relative to said flange.

2. The seal assembly of claim 1, wherein each of said block members is attached to the web-shaped structure by at least one bolt.

* * * * *